Sept. 25, 1934.    J. F. SCHENCK, JR    1,974,835
LABELING MACHINE
Filed Sept. 14, 1931    8 Sheets-Sheet 1

John F. Schenck, Jr.
INVENTOR.

BY
ATTORNEY.

Sept. 25, 1934.   J. F. SCHENCK, JR   1,974,835
LABELING MACHINE
Filed Sept. 14, 1931   8 Sheets-Sheet 2
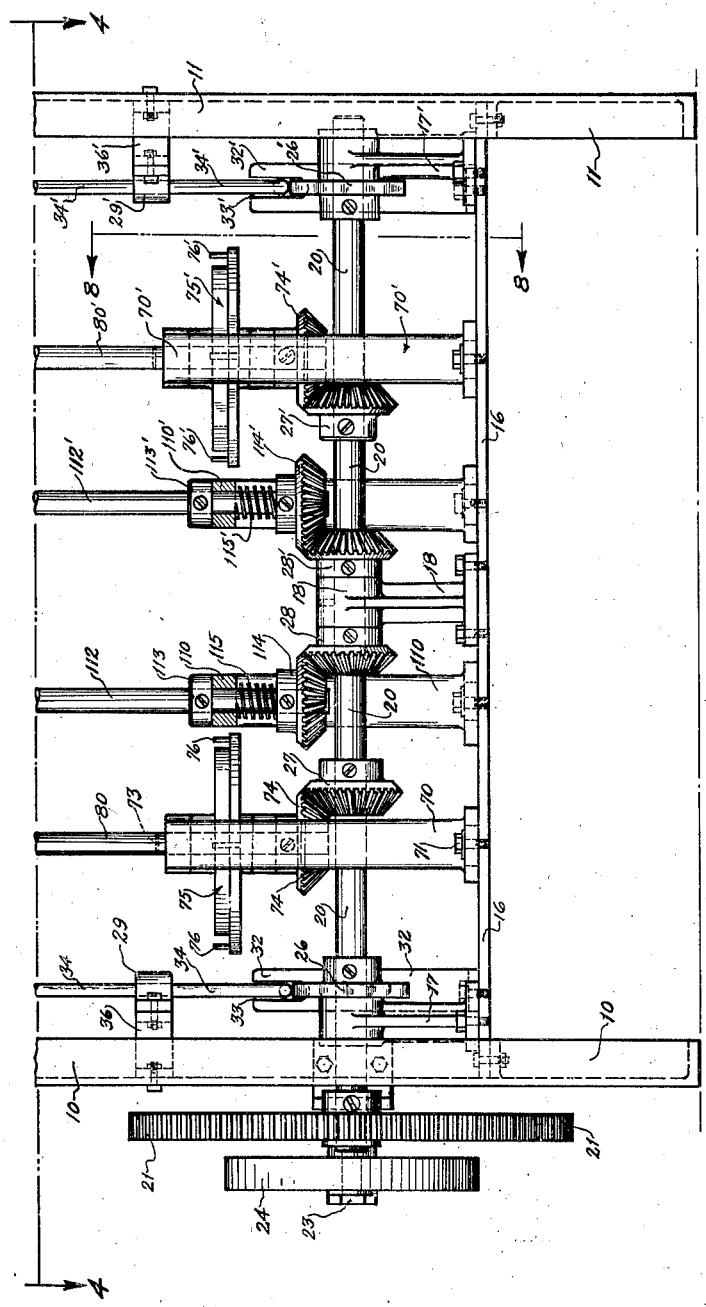
FIG. 2
JOHN F. SCHENCK, JR.
INVENTOR.
BY 
ATTORNEY.

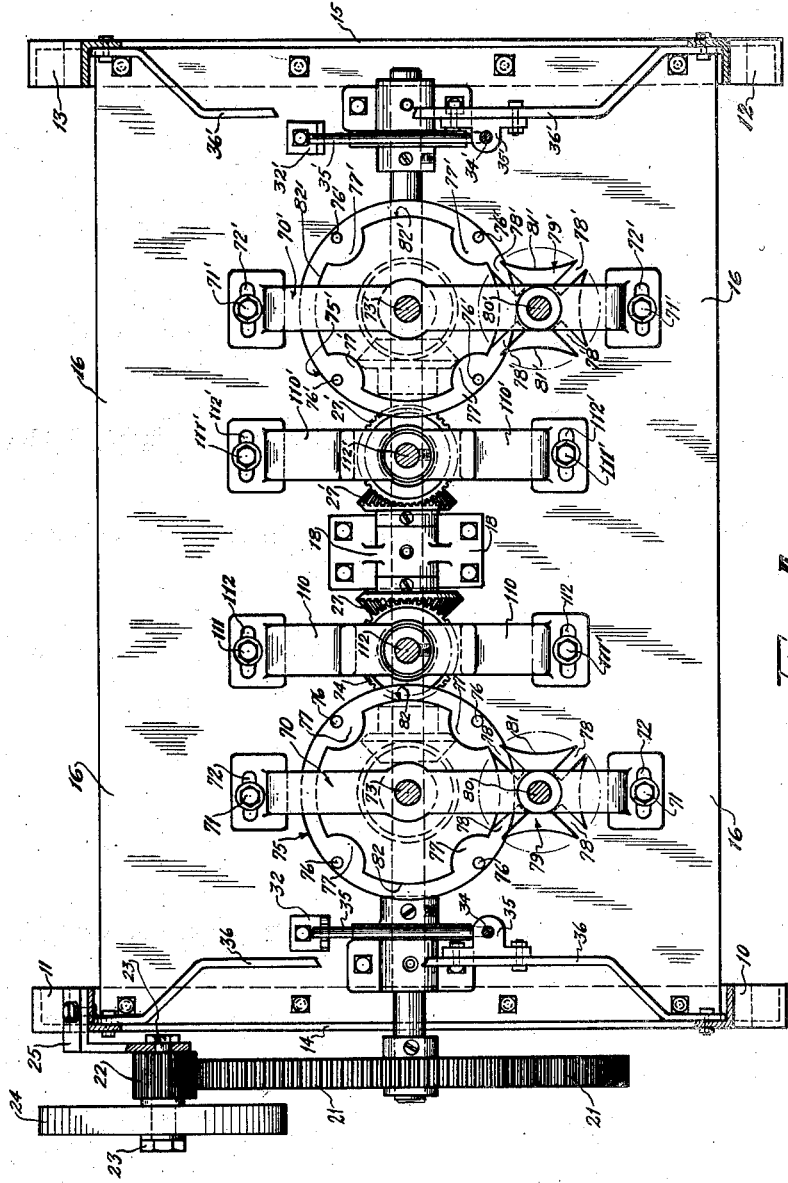

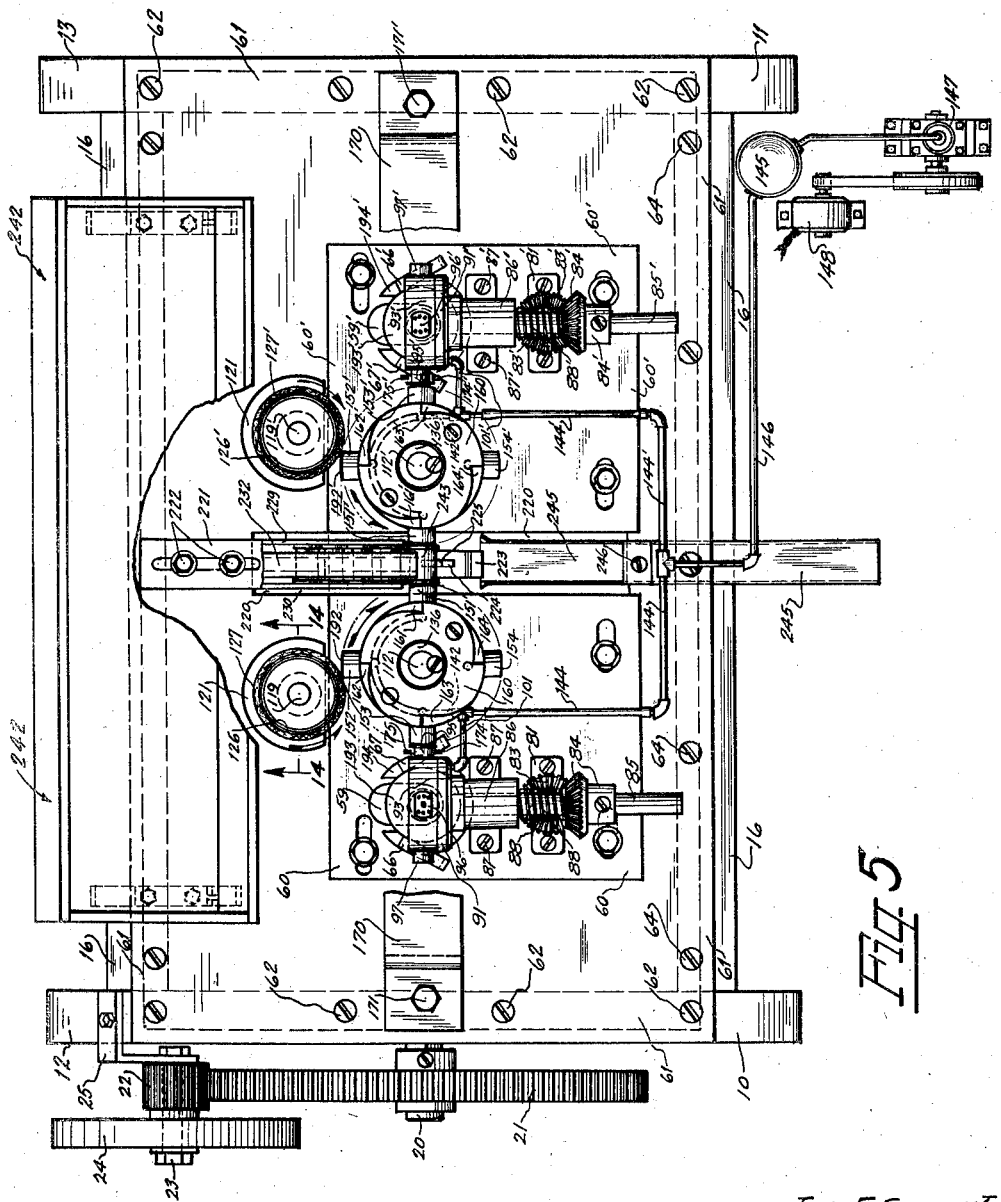

Sept. 25, 1934.  J. F. SCHENCK, JR  1,974,835
LABELING MACHINE
Filed Sept. 14, 1931   8 Sheets-Sheet 5
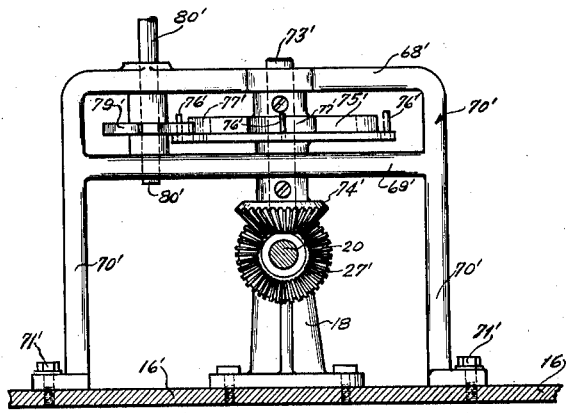
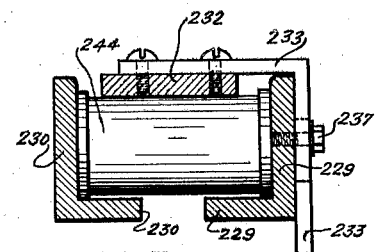
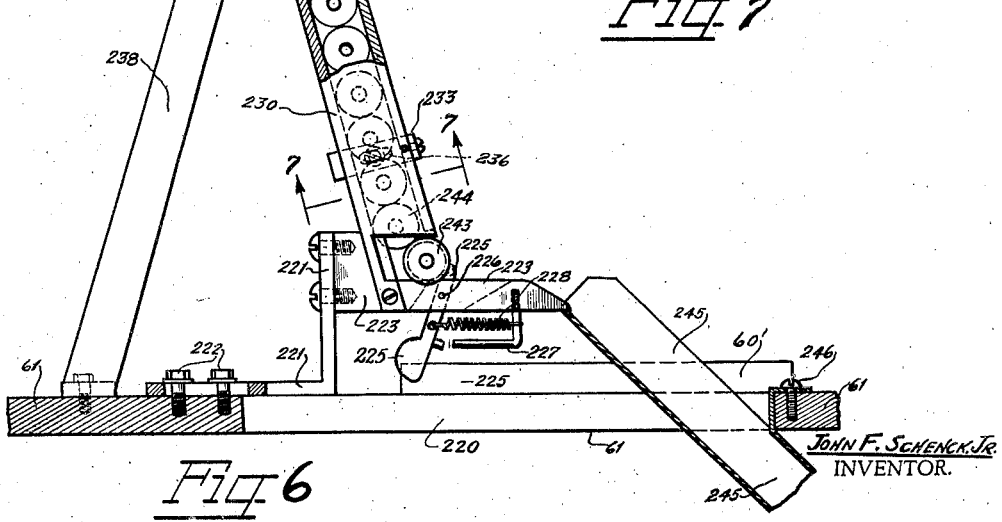
John F. Schenck, Jr.
INVENTOR.
BY
ATTORNEY.

Sept. 25, 1934.  J. F. SCHENCK, JR  1,974,835
LABELING MACHINE
Filed Sept. 14, 1931  8 Sheets-Sheet 6

JOHN F. SCHENCK, JR.
INVENTOR.

BY
ATTORNEY.

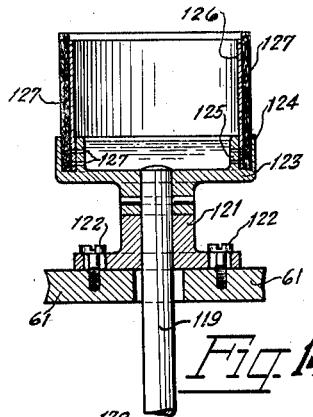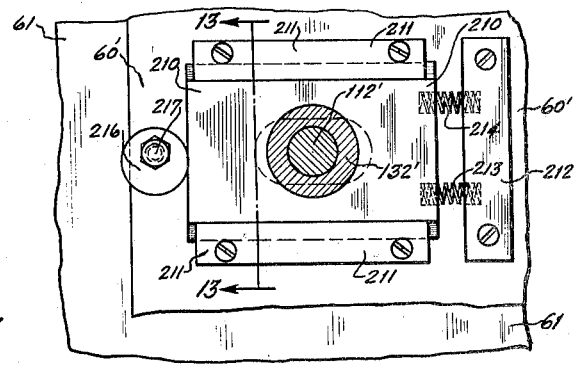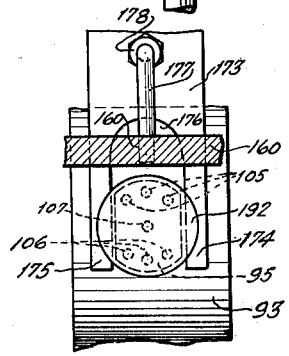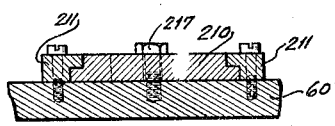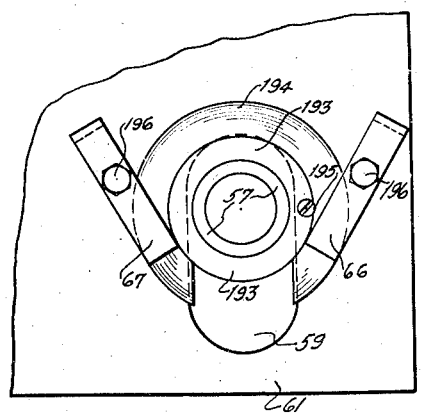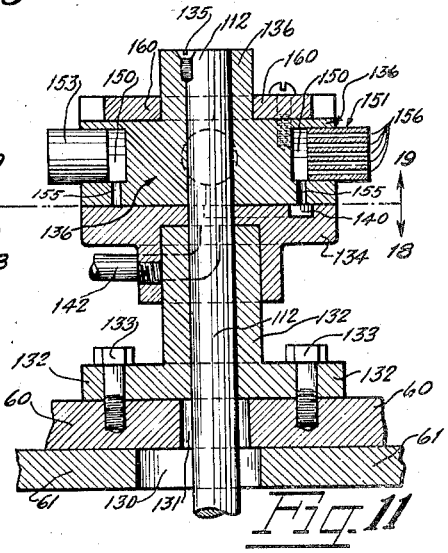

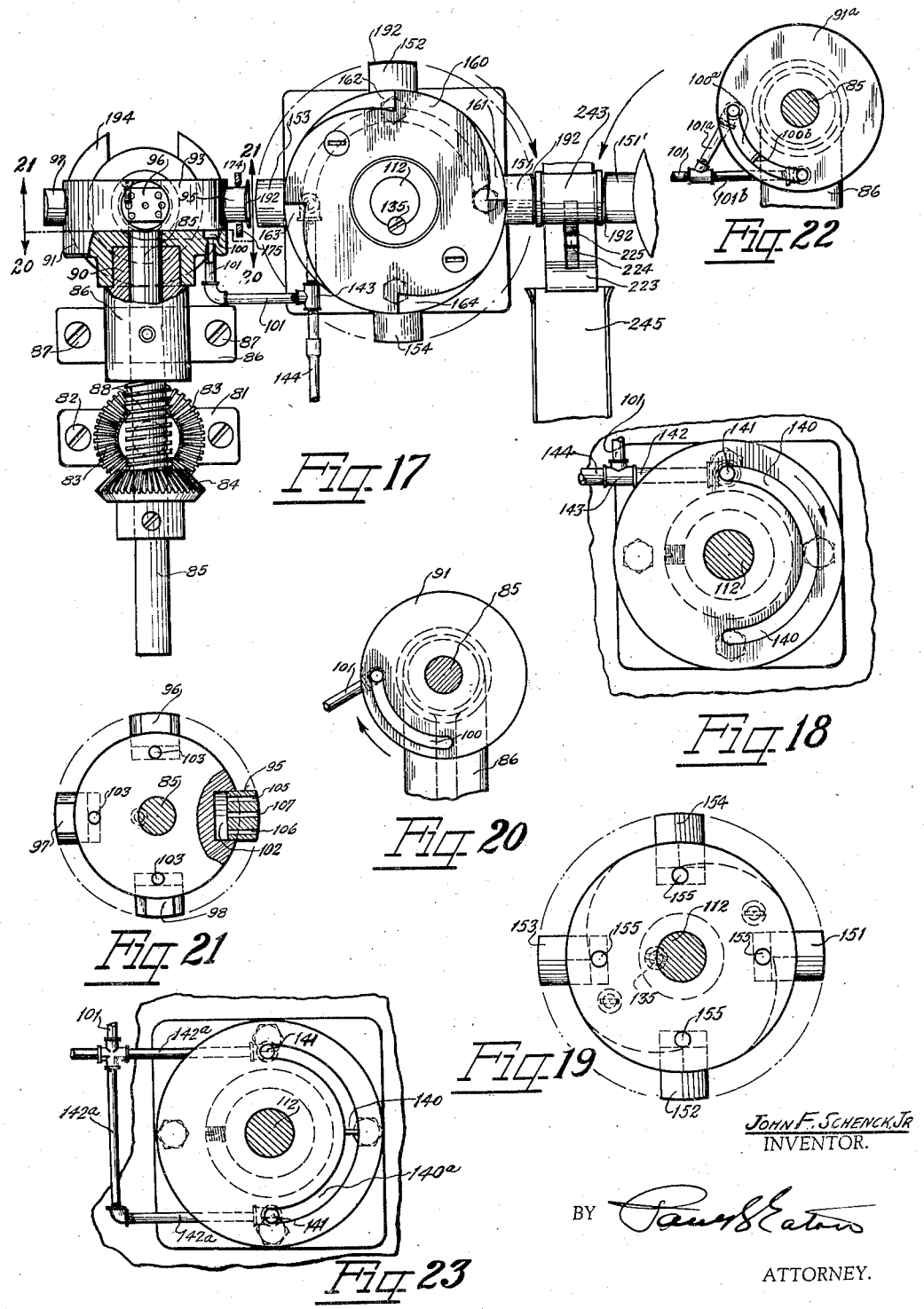

Patented Sept. 25, 1934

1,974,835

UNITED STATES PATENT OFFICE 1,974,835

LABELING MACHINE

John F. Schenck, Jr., Shelby, N. C.

Application September 14, 1931, Serial No. 562,797

43 Claims. (Cl. 216—10)

This invention relates to a machine for applying labels to articles of merchandise, and in the embodiment shown it is in the form of a machine for applying labels to the ends of spools of sewing thread and the like, though it is evident that this mechanism can be used for various purposes in the application of labels to various classes of merchandise.

An object of this invention is to provide a machine for applying labels to both ends of a package or article of merchandise as the article of merchandise is fed thru the machine, and in the embodiment shown, means are provided for timing the application of the label to the merchandise so as to properly position the same, said machine embodying means for feeding labels and means for picking the labels from the feeding means and transferring the same to the applying means and timing the transfer to cause the applying means to properly position the points at which the labels are applied on the articles of merchandise.

Some of the objects of the invention having been stated, other objects will appear as the description proceeds when taken in connection with the accompanying drawings, in which—

Figure 2 is a similar view of the lower portion of the machine;

Figure 3 is a view taken along the line 3—3 in Figure 1;

Figure 4 is a view taken along the line 4—4 in Figure 2;

Figure 5 is a top plan view of the machine;

Figure 6 is a view partially in cross section taken along the line 6—6 in Figure 1;

Figure 7 is a cross sectional view taken along the line 7—7 in Figure 6;

Figure 8 is a vertical sectional view taken along the line 8—8 in Figure 2;

Figure 11 is a vertical sectional view taken along the line 11—11 in Figure 1;

Figure 12 is a longitudinal sectional view taken along the line 12—12 in Figure 1;

Figure 13 is a cross sectional view taken along the line 13—13 in Figure 12;

Figure 14 is a vertical sectional view taken along the line 14—14 in Figure 5;

Figure 15 is a vertical sectional view taken along the line 15—15 in Figure 1;

Figure 16 is a plan view of the upper end of the label-feeding tube showing the means for adjustably securing the same in position;

Figure 17 is an enlarged view of pick-up and applying turrets as shown in the left central portion of Figure 5 with a portion thereof broken away for sake of clearness;

Figure 18 is a view taken along the line 18—18 in Figure 11;

Figure 19 is a view taken along the line 19—19 in Figure 11;

Figure 20 is a view taken along the line 20—20 in Figure 17;

Figure 21 is a view taken along the line 21—21 in Figure 17;

Figure 22 shows a modified form of Figure 20;

Figure 23 shows a modified form of Figure 18.

Figure 1:
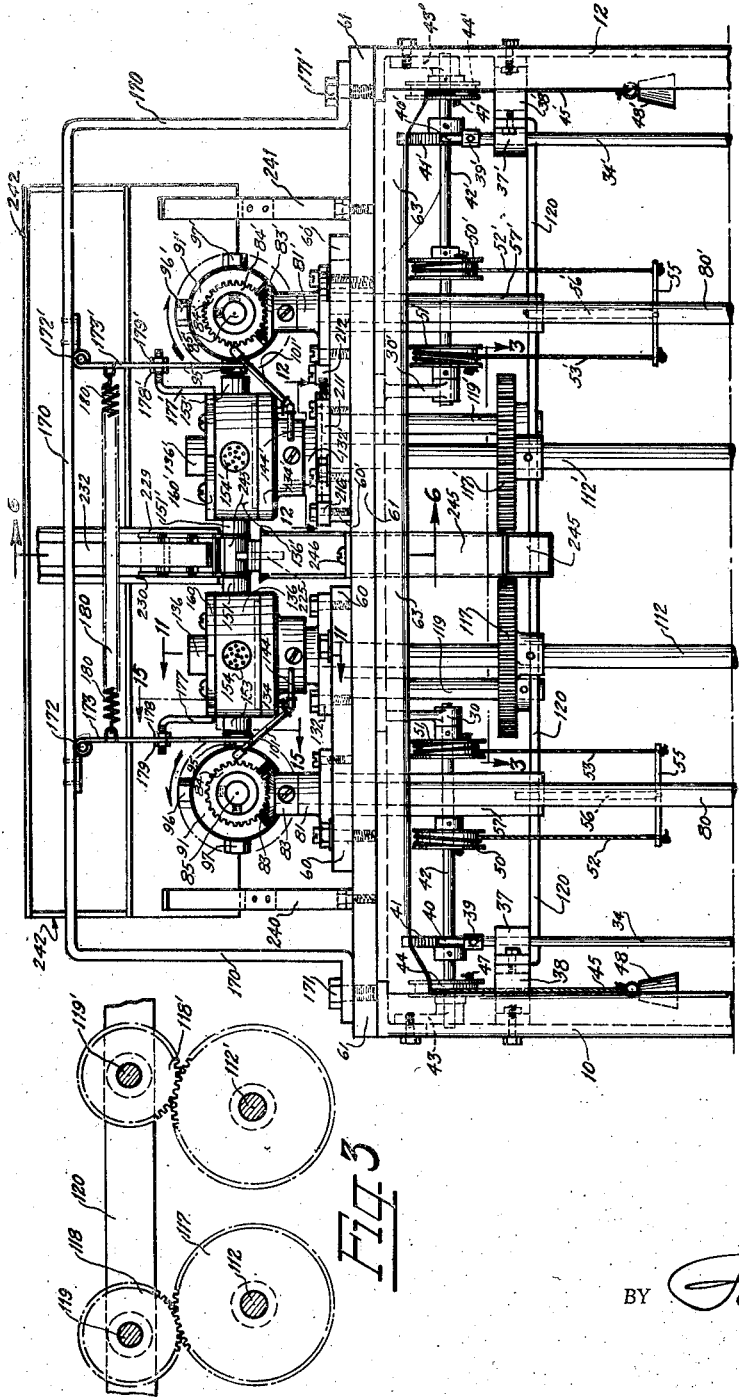
Figure 1 is a side elevation of the upper portion of the machine.

Referring more specifically to the drawings, the numerals 10, 11, 12, and 13 indicate the leg portions of the machine forming a frame-work, and spanning the distance between the legs 10 and 11 is a cross bar 14, and between legs 12 and 13 is cross bar 15, and on these cross bars is supported a plate 16 on which plate 16 are mounted the bearings 17, 18 and 17' in the upper ends of which is rotatably mounted the main drive shaft 20 which has thereon a gear wheel 21 which is driven by a pinion 22 mounted on a stud shaft 23 on which is fixedly secured a pulley or other driving means 24, said stud shaft being mounted in a bracket 25 secured to leg 11 of the machine.

Fixedly mounted on the main drive shaft 20 are a square cam 26 and bevel gears 27, 28, 27' and 28' and at the other end thereof is another square cam 26' identical to square cam 26. Secured on base plate 16 are guide members 32 and 32' which have slots 33 and 33' in the upper ends thereof in which are slidably mounted push rods 34 and 34' which have laterally projecting portions 35 and 35' thereon adapted to be engaged by cams 26 and 26' respectively. These push rods are slidably mounted in bearing members 29 and 29' secured on the end frameworks of the machine.

The above description is better understood by clipping the sheets of drawings containing Figures 1 and 2 together and treating Figures 1 and 2 as a complete showing of the side portions of the machine. By now referring to Figure 1 it is seen that the push rod 34 is also mounted in bearing portion 37 which bearing 37 is secured to a cross piece 38 similar to cross piece 36 which supports the lower bearing 35.

Push rod 34 has secured thereon a collar 39 which has a leaf spring pawl 40 secured thereon which is adapted to engage a ratchet wheel 41 which is fixedly secured on shaft 42 which shaft 42 is mounted at its two ends in brackets 43 and 30 projecting downwardly from the upper portion of the framework of the machine. This shaft 42 is rotatably mounted in these two brackets and has a flanged wheel 44 thereon on which is wound a cord 45 which has one end thereof secured to one of the flanges of the wheel as at 47, and the lower end of this cord has secured thereto a weight 48. The shaft 42 has fixedly secured thereon the spaced flanged wheels 50 and 51 which have cords 52 and 53 wound thereon and secured thereto in the same manner as cord 45 is secured to wheel 44. The lower end of cords 52 and 53 have secured thereto a cross piece 55 which has secured thereto—in the middle portion thereof—a plunger 56 which enters tube 57 and this tube projects thru a slot 59 in adjustable plate 60 mounted on top plate 61.

Top plate 61 is secured to the upper ends of the leg members 10, 11, 12, and 13 by conventional screws 62, and spanning the distance between the leg portions of braces 63 to strengthen the frame, and the screws 64 penetrate top plate 61 and are embedded in these braces 63 for further strengthening of the frame. The tube 57 is held in adjusted position by means of the clamps 66 and 67.

Figures 9, 10:
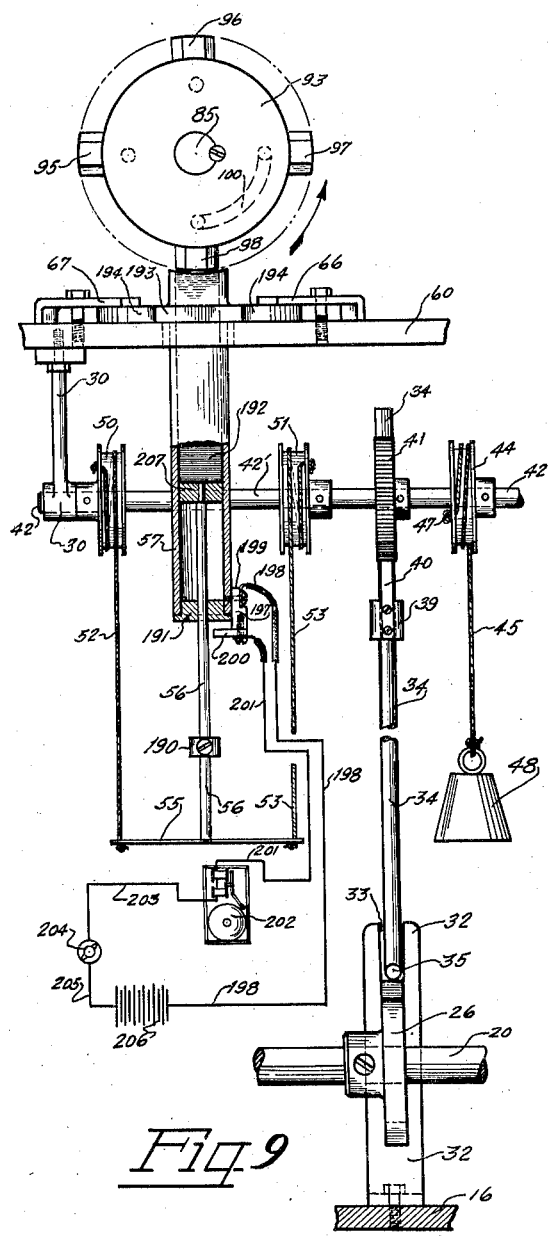
Figure 9 is an enlarged detail view of the label-feeding mechanism and associated parts as shown in the right hand portion of Figure 1.
Figure 10 is an end view of Figure 9 looking from the right-hand side thereof.

The means for feeding the labels to the pick-up turret is shown more fully in Figures 9 and 10. The tube 57 has plunger 56 with a collar 190 adjustably mounted thereon for limiting the upward movement of the plunger 56. A collar is also present on the other side of the machine but is not shown. The tube has a metallic plug 191 therein. The upper end of plunger 56 has a piston 207 thereon on which the stack of labels 192 are adapted to rest, and the tube 57 has a flange 193 thereon adapted to rest within the ring member 194 having a cut away portion in one side thereof to permit the tube 57 to be raised upwardly to cause the flange 193 to be lifted out of the member 194 to allow the tube to be removed. The clamps 66 and 67 are secured in position by means of stud bolts 196. It is seen that when a new supply of labels is desired to be inserted in the tubes that the tubes can be slid outwardly in the elongated slots in which they are secured for a new supply to be inserted therein.

On the lower end of the tube 57 is mounted an insulating block 197 which has a wire secured thereto by means of a screw 199 penetrating the insulating block and being inserted in the tube holding the labels. A contact member 200 is secured on the lower end of this insulating block to which is secured wire 201 which runs to an electric bell 202, and from the other side of this bell a wire 203 runs to a switch 204 which can be used to stop the bell ringing when desired, but is normally closed, and wire 205 goes to a source of electrical energy 206 and to the other side of this source of energy wire 198 is connected, the arrangement being that when the collar 190 engages contact point 200, a circuit will be closed thru the wires and electric bell and the source of energy and thru tube 57 and plug 191 to ring the bell to indicate that the supply of labels is becoming exhausted. This arrangement is present on both of the label feeding devices.

The label feed operates in the following manner:

As the main drive shaft rotates, cam 26 or 26'—as the case may be—raises the push rod 34 and the leaf spring pawl 40 engages the ratchet wheel 41, and this resists the weight 48 and permits the plunger 56 to descend by gravity and release pressure on the labels, and then when the push rod 34 returns to normal position, it is out of contact with the ratchet wheel 41 and the weight 48 causes the shaft 42 to rotate in the opposite direction and cause piston 207 to engage the stack of labels 192 and press them against the nozzle which is above the upper end of the tube. In this manner, no pressure is applied to the labels except when a nozzle is positioned above the upper end of the tube holding the labels. Furthermore, by this arrangement regardless of the number of labels in the tube, the pressure will always be uniform on the stack of labels in the tube.

Adjustably mounted on plate 16 is a bracket 70 (see Figs. 4 and 8) which is adjustably secured to plate 16 by means of stud bolt 71 penetrating longitudinally disposed slots 72. This bracket has transversely disposed portions 68 and 69, and in these portions of the bracket, is mounted a shaft 73 which has fixedly secured on the lower end thereof bevel gear 74 which meshes with bevel gear 27 on drive shaft 20, and this shaft 73 has also secured thereon a pin wheel 75 having four pins 76 thereon with suitable cavities 77 associated therewith, which is a conventional portion of a Geneva stop movement. The pins 76 are adapted to engage slots 78 in star wheel 79, fixedly mounted on shaft 80, and star wheel 79 has concave surfaces 81 on its periphery adapted to coincide with the curved surfaces 82 between the pins 76, the above described arrangement being a conventional Geneva stop movement for imparting intermittent movement to shaft 80.

The shaft 80 extends thru top plate 61 and adjustable plate 60, there being an enlarged opening, not shown, in the top plate 61 for allowing adjustment of shaft 80 along with adjustable plate 60. This shaft is mounted in a bracket bearing 81 secured on top of adjustable plate 60 by means of screws 82, and on the upper end of shaft 80 is mounted a bevel gear 83 which meshes with bevel gear 84 adjustably secured on shaft 85 which shaft is rotatably mounted in a bracket bearing 86 secured to adjustable plate 60 by means of screws 87. Bracket bearing 86 has a reduced projection 90 thereon on which is driven home a disk 91 to form a non-revoluble fit and to hold disk 91 in fixed position, it being to all intents and purposes an integral part of bracket bearing 86. The shaft 85 extends also thru disk 91 and has fixedly secured on the end thereof a pick-up turret 93 which has the four nozzles 95, 96, 97 and 98 (see Fig. 21) which are adapted to pass in close proximity to the upper end of the label holding tube previously described. Between bearing 86 and gear 84 is a compression spring 88 to resiliently force the turret against the face of disk 91.

The fixed member 91 has an arcuate groove 100 in the surface thereof adjoining turret 93 which extends, beginning at the lower portion thereof, upwardly on one side thereof as shown in Figure 20 a distance of slightly more than 90 degrees and has suction pipe 101 communicating therewith. The nozzles are provided with an outer surface which is shown as concentric, and these nozzles are mounted in cavities 102 and port holes 103 lead from the cavities to the surface of turret 93 which fits against the surface of member 91 to communicate with the cavities in which the nozzles are mounted. The nozzles can have any desired surface which, however, should be higher in the middle than at the edges so the label will be picked up at its outer portions first to cause only one label at a time to be removed from the stack of labels. By the above arrangement it is seen that the outer edges of the label are picked up first while the central portion of the nozzle holds the label down on its stack and therefore the edges being picked up first, breaks any vacuum which might be present between the labels and therefore causes only one label at a time to be picked up.

The nozzles have a plurality of openings 105 near one edge thereof and a plurality of other openings 106 near the other edge thereof with a central opening 107 in the center thereof causing the greater amount of suction to be applied to the outer edges of the labels when the same are picked up to cause the edges of the label to be picked up first from the stock thus breaking any vacuum which might exist between the labels and cause only one label at a time to be picked up.

By the above arrangement, it is seen that two port holes 103 are in communication with the slot 100 while turret 93 is at rest, that is the port hole of the nozzle picking up the label and the port hole of the nozzle in position for the label to be transferred to the applying turret, which will be presently described.

On account of the relatively large amount of suction which is applied to the turret, the fact that a nozzle does not have a label thereover, while suction is being applied thereto, does not break the suction to a sufficient degree to cause the other labels held by the turret to be released, because the holes in the nozzles are relatively small and the suction applied to the turret is sufficient to hold the labels on the turret even though some of the nozzles do not have a label thereon.

Adjustably mounted on plate 16 (see Fig. 2) is an inverted U-shaped brace 110 (Figure 4) which is secured to the plate 16 by means of stud bolts 111 penetrating elongated slots 112 in the lower ends of the U-shaped brace, and mounted in the upper portion of the U-shaped brace and penetrating the same is a rotatable shaft 112 which has adjustably mounted thereon a collar 113, and on the lower end thereof is adjustably mounted a bevel gear 114 with a compression spring 115 between the lower surface of the U-shaped member 110 and the upper surface of the bevel gear 114. The bevel gear can be adjusted vertically and the collar 113 can be adjusted vertically to cause the proper amount of downward pressure to be exerted, at all times, on shaft 112 for purposes of causing a close fit between a rotating turret and fixed parts associated with the upper end of the shaft as shown in Figure 1 and which will be presently described.

The rotatable shaft 112 has mounted thereon a spur gear 117 which meshes with a pinion 118 on a vertically disposed shaft 119 which has its lower end mounted in a transverse brace 120 and the upper end of this shaft 119 penetrates top plate 61 (see Fig. 14) and is rotatably mounted in the bearing 121 secured to the top plate 61 by means of stud bolts or screws 122.

Fixedly secured on the upper end of shaft 119 is a cup 123 which has two concentric projections 124 and 125 projecting from the upper surface thereof near the periphery thereof, and a shell member 126 is surrounded by a porous fibrous member such as a tubular lamp wick, and perforations 127 penetrate the concentric projection 125 and shell 126 to allow moistening material such as water to be contained within the shell 126, and to gradually leak thru the perforations to maintain the moistening apparatus in proper condition for applying moisture to the labels. The spur gear 117 and pinion 118 have a ratio which causes the periphery of the moistening apparatus to travel at the same rate of speed as the turret for applying the labels to the spools of thread which structure will be presently described.

Shaft 112 extends thru a cavity 130 in top plate 61 and also a cavity 131 in adjustable plate 60 also extends loosely thru bearing member 132 secured on adjustable plate 60 by means of stud bolts 133 and shaft 112 extends thru a fixed flanged bearing portion 134 secured on bearing 132, and the upper end of shaft 112 has fixedly secured thereon by means of a key or screw 135, a turret 136 which is designated as the label applying turret, as it operates to receive the label from the pick-up turret and to apply it to the spool of thread.

Fixed bearing member 134 has in the upper surface thereof (see Fig. 18) an arcuate groove 140 extending slightly more than 180 degrees and a port hole 141 communicates therewith from the lower side of said member 134, and a pipe 142 is secured therein which pipe is secured to T member 143 to which is also secured pipe 101, previously described, and a pipe 144 is connected to vacuum 145, by means of an exhaust pump 147 driven by any suitable motor 148.

In turret 136 are provided cavities 150 in which are mounted four nozzles 151, 152, 153 and 154 spaced ninety degrees from each other around the periphery of the turret. Communicating with each of the cavities (see Fig. 19) are the port holes 155 which are adapted to communicate with slot 140 as the turret is rotated to cause three of the nozzles to have a vacuum pulling thereon while the turret is in the position shown in Figure 17, or in other words (by referring to Figure 17) a vacuum is exerted on nozzles 151, 152 and 153 in the position shown causing a vacuum to be applied to a particular nozzle from the time it receives a label from the pick-up turret until the label is applied to the spool of thread. The compression spring 115 and the adjustment of bevel gear 114 and collar 113 are provided for causing a close rotatable fit between members 134 and the turret 136 to prevent leakage of air to any appreciable extent, and therefore, causes a vacuum to be built up to the three nozzles as above described.

In the position shown in Figure 17, the labels are applied to both ends of the spool 243 and suction is also on the labels, but the labels are being pressed against the ends of the spool. As the turrets 136 and 136' revolve, they carry the spool 243 with them and thus, as they move, suction is cut off as the nozzles applying the labels move from over slots 140 and 140'.

Each of the nozzles 151 to 154 inclusive has a plurality of perforations 156 therein thru which the vacuum is exerted to cause the labels to be held on the nozzles until they are transferred to the end of the spool of thread as the turret is rotated. The outer ends of these nozzles have a concentric surface to cause the labels to be applied to the ends of the spools of thread as the turrets are rotated with equal pressure at all points.

Secured on top of turret 136 is a cam member 160 (see Figs. 5, 11 and 17) which has four cavities 161, 162, 163 and 164 which have sloping surfaces. The cavities 161 to 164 just mentioned are provided for controlling the transfer of the labels from the pick-up turret to the applying turret. The transfer means comprises an inverted U-shaped member 170 (see Figs. 1, 5 and 15) which U-shaped member extends across above the top plate 61 and has its ends secured thereto by means of stud bolts 171, and on this member 170 is pivotally secured as at 172 a member 173 which projects downwardly and is forked at its lower end, and the portions 174 and 175 occupy a position on each side of the nozzles 95, 96, 97 and 98, these nozzles being flattened on their sides to allow a portion of the label 192 to project on each side of the nozzles and to allow the forks 174 and 175 to fit behind the projecting portions of the label. The length of the cavity 176 appearing between the forks 174 and 175 is to allow the nozzles to rotate free of the member 173.

The member 173 has an adjustable L-shaped member 177 secured thereto by means of nuts 178 and 179 on each side thereof so that the member 177 can be adjusted laterally in either direction to time the point at which the member 173 will be allowed to transfer the label from the pick-up turret to the applying turret due to the fact that spring 180 will cause the portion 177 to fall into one of the cavities 161 to 164 as the case may be and throw the label against one of the nozzles 151 to 154 as the case may be and cause the vacuum applied thereto to retain the labels in the exact position as transferred and to cause the labels to be applied to the end of the spools in the mechanism.

The turret 136 for applying the labels to one end of the spool is not resiliently mounted. A complete description has been given of one side of the machine, and the other side of the machine is identical in all respects except the mounting of the turrets for applying the labels to the end of the spools and therefore, it is not deemed necessary to describe completely the other half of the machine by the reference characters used for the first half, already described. Therefore, like reference characters are applied in the other half of the machine with the prime notation attached to each of the reference characters.

It might be well to state, however, that the turret 136' is adjustably mounted to take care of slight variations in the length of the spools and other points of adjustment. Bearing 132' (see Fig. 12) has an enlarged portion 210 which is slidably mounted in guides 211 which are secured on the plates 60' and these guides are secured by conventional screws. A bar 212 is secured on plate 60' and the member 210 has cavities in the rear edge thereof into which compression springs 213 and 214 project. The other ends of these springs fit into cavities in the proximate face of bar 212, the purpose of these springs being to normally urge the slide 210 toward the end of the spool of thread and is limited in its movement toward the spool of thread by an adjustable eccentric member 216 secured by a clamping screw 217 on plate 60'.

The mechanism for feeding the spools to the turrets for applying the labels thereto is shown in Figures 6 and 7. In Figure 6 there is seen a transverse slot 220 in top plate 61. A bracket 221 is secured adjustably to plate 61 by means of stud bolts 222 which bracket projects upwardly and has secured thereto the foot 223 which is slotted as at 224 (see Fig. 5) for the reception of a dog 225 pivoted as at 226 which projects upwardly above the upper surface of foot 223 and projects normally into the path of the lowermost spool of thread 243. A stop 227 limits the movement of dog 225 in one direction and a tension spring 228 normally holds the lower end of the dog against the stop member. Projecting upwardly from and secured to foot member 223 are the spaced side members 229 and 230 forming a chute 231 thru which the spools of thread pass. A cover plate 232 is secured between the members 230 and 231 in an adjustable manner by brackets 233 and 234 which are slotted as at 236 and penetrated by a stud bolt 237. A suitable brace 238 may be employed if desired for supporting the upper portion of the chute.

The spools of thread can be supplied to the chute in any desired manner as by machine assortment, but in the drawings, I show the brackets 240 and 241 secured on plate 61 for supporting a box 242 in which the spools of thread are contained and from whence they are fed into the flared upper end of the chute by an operator. It is evident that assorting devices of various kinds may be employed for aligning the spools and feeding them into the chute if desired. When the label applying turrets are revolved to simultaneously engage both ends of the lowermost spool 243, they engage the spool and force it out over dog 225 against the pressure of tension spring 228, and when this spool passes out of position, one of the other spools 244 takes the position occupied by spool 243 and the operation is repeated.

After the spool is labeled by the two turrets, it is rolled on foot 223 and falls into chute 245 which is supported as at 246, which chute extends laterally to one side of the machine and delivers the labeled spools of thread into containers or any other suitable mechanism.

A slightly modified form of the suction means for the revolving turrets is shown in Figures 22 and 23, and in Figure 22, the portion 91a has the groove 100a provided with a partition 100b, and the pipe 101 is divided into two branches 101a and 101b so that the suction to two adjacent nozzles will be more evenly maintained.

In Figure 23 slot 140a has a partition 140b and instead of a single pipe, two pipes 142a are provided to lead to opposite ends of the groove 148 to cause the suction in both ends of groove 140a to be more uniformly maintained than with a single connection. The partitions 100b and 140b are very thin and almost approach a knife edge, to prevent interference with the vacuum when one of the ports for the turrets passes over the partition.

Although the method of operation of various features of the machine has been set forth in the description, it might be stated that the shafts 80 and 80' are moved intermittently by means of pins 76 engaging the star wheel on shaft 80 and this causes an intermittent motion to be imparted to the turrets 93 and 93' for picking up the labels from the upper ends of the tubes 57 and 57' and at the time one of the nozzles is positioned above the stack of labels the vacuum will be applied to this nozzle and will continue to hold the label on the nozzle and an intermittent motion will be applied to the turrets 93 and 93' and they will be moved a quarter turn to coincide with one of the nozzles of applying turrets 136 and 136' and these turrets are rotated continuously, and when the members 177 drop into the cavities in the cam on top of each of the turrets 136 and 136' the label will be snatched from the nozzle on the turret which picked it up from the stack of labels and thrown against the nozzle on the applying turret and the turrets 136 and 136' will continuously move the gummed side of the label into contact with the moistening apparatus 127 rotating at the same rate of speed and then the nozzles containing the labels will move against the ends of the spools 243 and press the labels on the ends of the spools.

The position of the label on the applying nozzle is determined by the time at which it is picked from the pick-up turret nozzle and transferred to the nozzle of the applying turret. It is thus seen that a vacuum is at all times on the nozzle on the lower side of the pick-up turrets 93 and 93' and extends until the label is snatched from the nozzle and transferred to the applying turrets 136 and 136', and for the balance of rotation of the turrets 93 and 93' the vacuum is not allowed to be applied to the nozzles while they are not in a work-performing position. By looking at Figure 1 it is seen that the nozzle on turrets 136 and 136' which is nearest the observer has no vacuum thereon when in this position as it is not in work performing relation, but in the position from the time it receives the label from the pick-up turret 93 or 93' as the case may be, until the time the label is applied to the end of the spool, the vacuum is exerting an influence on the nozzle while traveling slightly more than 180 degrees of its movement.

In the drawings and specification there has been set forth a preferred embodiment of the invention and although specific terms are employed they are used in a generic and descriptive sense only and not for purposes of limitation, the scope of the invention being set forth in the appended claims.

I claim:—

1. In a machine for applying labels to articles, means for selecting one label at a time, means for applying the label to the article, means for transferring the label from the selecting means to the applying means and means for rendering one surface of the label adhesive while it is held by the applying means.

2. In a machine for applying labels to articles, means for supporting a mass of labels, means for intermittently applying a pressure of approximately equal force on said labels, means for detaching one of said labels at a time from said mass and holding the same, means for applying the label to the article, means for transferring the label from the detaching means to the applying means, and means for rendering the label adhesive before it contacts with the article.

3. In a machine for applying labels to articles, two constantly driven spaced turrets, the periphery of said turrets having fixed suction nozzles thereon, means for supplying articles to a point where a set of nozzles on the turrets will simultaneously engage opposite sides of the article to apply a label thereto and means for supplying adhesive labels to said nozzles.

4. In a machine for labeling articles, means for feeding a mass of separated labels by applying thereto, intermittently, a pressure of approximately equal force, means for detaching one label at a time from the mass, means for applying the label to the article, means for transferring the label from the detaching means to the applying means, adjustable means for timing the said transferring operation and means for moistening one side of the label before it is applied to the article.

5. In a machine for labeling articles, means for feeding a stack of labels under a pressure of approximately equal force intermittently applied, vacuum means for picking one label at a time from the stack of labels, means for applying the labels to the articles, means for transferring the labels from the picking means to the applying means, and means for moistening the label after it is received by the applying means.

6. In a machine for applying labels to articles of merchandise, two constantly driven spaced revolving turrets, each of said turrets having fixed suction means spaced along the periphery thereof, means for feeding articles to pass between the turrets and to receive pressure simultaneously on opposite sides by the suction means, a second intermittently revolving turret associated with each of said first turrets, the second turrets having fixed suction means along the periphery thereof, means for supplying labels to the suction means on the second turrets, means for transferring the labels from the second turret to the first turret for application to the articles and means associated with said turrets for rendering said labels adhesive before application to the articles.

7. In a machine for applying labels to articles, means for holding a mass of separated labels, means for exerting an intermittent pressure on said mass of labels, means for removing one label at a time from said mass while the mass is under pressure and transferring it to another portion of the machine, means for applying the label to the article, means for transferring the label from the removing means to the applying means, means for timing said transfer, and means for rendering one side of the label adhesive while it is held on the applying means.

8. In a machine for applying labels simultaneously to both ends of a spool of thread, two separate means for feeding a stack of labels under intermittent pressure, means for selecting a label simultaneously from each of the feeding means, means for applying the labels simultaneously to both ends of the spool and moving the spool thru the machine, means for simultaneously transferring the two labels from the selecting means to the applying means, and means for timing the transfer to control the position of the labels on the spool of thread.

9. In a machine for applying labels to merchandise, means for holding a stack of labels, an intermittently moving revolving turret having fixed nozzles provided with vacuum means for picking one label at a time from the stack, a second continuously driven revolving turret having fixed nozzles provided with vacuum means, means for transferring the labels from the first turret to the second turret, means for rendering the labels adhesive while on the second turret, means for supplying articles to be labeled to the second turret to be engaged by the nozzles on the second turret to apply the labels to the article.

10. Means for applying labels to articles comprising means for holding a stack of superimposed labels, means for intermittently exerting pressure on said labels to feed the same, means for detaching one label at a time while the stack is under pressure, means for causing the pressure exerted to remain approximately uniform when intermittently applied regardless of the number of labels in the machine, and means for successively applying the detached labels to the articles.

11. Means for applying labels to articles comprising means for holding a stack of superimposed labels, means for intermittently exerting pressure on said labels to feed the same, means for detaching one label at a time while the stack is under pressure, means for causing the pressure exerted to remain approximately uniform when applied regardless of the number of labels in the machine, and means for removing the labels from the detaching means and transferring them to the applying means.

12. Means for applying labels to articles comprising means for holding a stack of superimposed labels, means for intermittently exerting pressure on said labels to feed the same, means for detaching one label at a time while the stack is under pressure, means for causing the pressure exerted to remain approximately uniform when intermittently applied regardless of the number of labels in the machine, means for removing the labels from the detaching means and transferring them to the applying means, and means for rendering the labels adhesive.

13. In a machine for applying labels to articles of merchandise, two separated revolving turrets having spaced fixed nozzles along the periphery of each turret, means for creating a vacuum in said nozzles, means for supplying the articles to pass between the turrets and to be simultaneously engaged by a nozzle on each of the turrets to apply a label to oppositely disposed portions of the article.

14. In a machine for applying labels to articles of merchandise, two separated revolving turrets having spaced fixed nozzles along the periphery of each turret, means for creating a vacuum in said nozzles, means for supplying the articles to pass between the turrets and to be simultaneously engaged by a nozzle on each of the turrets to apply a label to oppositely disposed portions of the article, and means for supplying labels to said nozzles.

15. In a machine for applying labels to articles of merchandise, two separated revolving turrets having spaced fixed nozzles along the periphery of each turret, means for creating a vacuum in said nozzles, means for supplying the articles to pass between the turrets and to be simultaneously engaged by a nozzle on each of the turrets to apply a label to oppositely disposed portions of the article, an intermittently driven revolving turret associated with each of said first turrets having fixed nozzles along the periphery thereof provided with a vacuum, means for supplying labels to the nozzles on the intermittently driven turrets and means for transferring the labels from the intermittently driven turrets to the first named turrets.

16. In a mechanism for applying labels to articles of merchandise, a circular revoluble turret having a plurality of nozzles fixedly mounted in the periphery thereof, means for applying a vacuum successively to each of said nozzles, means for feeding labels to said nozzles, a second revoluble turret mounted in operative relation to the first turret, a plurality of spaced nozzles mounted in the periphery of said second turret, means for successively creating a vacuum in said nozzles in the second turret, means for transferring a label from a nozzle on the first turret to a nozzle on the second turret and means for causing the label on the nozzle on the second turret to be applied to the article.

17. In a machine for applying labels to merchandise, two revolving turrets spaced apart from each other to receive the article therebetween, fixed suction means on the periphery of the turrets, means for supplying adhesive labels to the suction means, means for successively supplying the articles to be engaged on opposite sides by said suction means to apply the labels to the articles, and means for relieving the suction on said suction means when the labels carried thereby are applied to the article.

18. In a machine for applying labels to articles, a label container, means for selecting labels one at a time from said label container, said selecting means comprising suction nozzles having convex faces provided with air inlets near the outer edge thereof, means for removing the labels from said suction nozzles and applying said labels to the articles and means for rendering said labels adhesive before they contact with the articles.

19. In a machine for applying labels to articles, a label container, means for selecting labels one at a time from said label container, said selecting means comprising suction nozzles having convex faces provided with air inlets near the outer edge thereof, means for removing the labels from said suction nozzles and applying said labels to the articles, the means for removing the labels from the suction means comprising suction nozzles having characteristics similar to the first mentioned suction nozzles and means for rendering said labels adhesive before they contact with the articles.

20. In a labeling machine, a vertically disposed tube for containing a stack of labels, means for intermittently applying pressure to the lower end of the stack of labels to move the same upwardly in the tube, a revolving member having suction nozzles thereon for picking one label at a time from said stack of labels, a second revolving member whose axis is disposed at right angles to the axis of the first revolving member and having a plurality of suction nozzles thereon, means for applying suction to all of said nozzles, means for releasing the suction one at a time on the nozzles on the first revolving member as each suction nozzle on the first revolving member coincides with a nozzle on the second revolving member, means for feeding articles to be labeled to a point where the articles will be engaged one at a time by the nozzles on the second revolving member to apply the label to the article and means for rendering the suction ineffective on each of the nozzles on the second revolving member as it is withdrawn from contact with the article to which the label is applied.

21. In a machine for applying labels to articles, suction means for applying the label to the article, means for holding a mass of labels, other suction means for picking up one label at a time from the mass of labels, means for transferring the label from the second suction means to the first suction means and means for rendering one surface of the label adhesive while it is held by the applying means.

22. In a machine for applying labels to articles, suction means for applying the label to the article, means for holding a mass of labels, other suction means for picking up one label at a time from the mass of labels, means for transferring the label from the second suction means to the first suction means and means for rendering the label adhesive.

23. In a machine for applying labels to articles, means for holding a mass of superposed labels, suction means for selecing one label at a time from the mass, other suction means for receiving the label from the selecting means and placing it on the article, means for knocking the label off the first suction means and throwing it against the other suction means for application to the article.

24. Means for applying a label to opposite portions of an article comprising a pair of spaced rotating members for simultaneously applying pressure to the opposite portions of the article, a pair of rotating means for selecting a label from a mass of labels and moving the same towards the pressure applying means, means for simultaneously transferring the labels from the selecting means to the two pressure applying means, means for rendering the labels adhesive while on the pressure applying means, one of the pressure applying means being resiliently mounted to resiliently engage the article and cause the labels to be applied thereto and then to move the article with the label applied thereto between the spaced rotating means and out of the machine.

25. In a machine for applying labels to articles, means for holding a stack of labels, suction means for selecting the topmost label from said stack and holding the same, other suction means for applying the label to the article, means for knocking the label off the first suction means and throwing it against the other suction means, and means for timing the relative position of the two suction means when the knocking occurs whereby the position of the label on the article is regulated.

26. In a machine for applying labels to articles, means for supporting a stack of superposed labels, intermittently operated means for applying a pressure of approximately equal force on said labels, suction means for picking up one label at a time from the top of said stack of labels, and holding said label, rotary suction means for applying the selected labels to the article, means for knocking the label off the first suction means and transferring the label to the other suction means, and means for rendering the label adhesive while it is held by the said other suction means before it is applied to the article.

27. In a machine for applying labels to articles, two constantly driven spaced turrets, the periphery of said turrets having a plurality of spaced nozzles projecting therefrom, an intermittently driven turret for each of the constantly driven turrets, means for applying a suction to some of said nozzles on all of said turrets, means for presenting a stack of labels to the nozzles on the intermittently driven turrets to cause them to engage and hold a label, means for relieving the suction on one nozzle at a time on said intermittently driven turrets and transferring the label thereon to a nozzle on a constantly driven turret, means for rendering one side of the label adhesive while held by the constantly driven turrets, means for feeding the articles to be labeled between the turrets to be engaged by a pair of nozzles on said constantly driven turrets to apply the labels to the articles and to move the labeled article to another position in the machine.

28. In a machine for labeling articles, means for holding a stack of separated labels, means for applying to the mass an intermittent pressure of approximately equal force, rotary suction means for detaching one label at a time from the mass and holding and moving the same, other rotary suction means for applying the label to the article, means for transferring the label from the first rotary suction means to the second rotary suction means, adjustable means for timing the transferring operation to determine the position the label will occupy on the article, and means for causing the label to adhere to the article.

29. In a machine for labeling articles, means for holding a mass of separated labels, means for applying to the mass an intermittent pressure of approximately equal force, rotary suction means for detaching one label at a time from the mass and holding and moving the same, other rotary suction means for applying the label to the article, means for transferring the label from the first rotary suction means to the second rotary suction means, adjustable means for timing the transferring operation to determine the position the label will occupy on the article, and means for rendering the label adhesive before it is applied to the article.

30. In a machine for labeling articles, means for holding a stack of separated labels, means for applying to the stack an intermittent pressure of approximately equal force, rotary suction means for detaching one label at a time from the stack and holding and moving the same, other rotary suction means for applying the label to the article, means for transferring the label from the first rotary suction means to the second rotary suction means, adjustable means for timing the transferring operation to determine the position the label will occupy on the article, the side of the labels to be applied to the article having an adhesive substance thereon, and means for moistening the adhesive side of the label to cause it to adhere to the article.

31. In a machine for labeling articles, means for holding a stack of labels, means for intermittently applying to said stack of labels a pressure of approximately equal force, partial vacuum means for picking one label at a time from said stack of labels while the stack is under pressure, other vacuum means for applying the labels to the articles, means for transferring the labels from the first vacuum means to said other vacuum means, and means for rendering one side of the labels adhesive before they are applied to the articles.

32. In a machine for labeling articles, intermittently operated suction means for receiving and holding a label, means for holding a stack of labels, means for intermittently applying to said stack of labels a pressure of approximately equal force to present the outermost label on the stack to the intermittently operated suction means, other suction means for receiving the labels from the first suction means and applying the labels to the articles, means for transferring the labels from the first suction means to the other suction means, and means for rendering the labels adhesive while on the second suction means.

33. In a machine for applying labels to opposed portions of the articles, two constantly driven spaced revolving turrets, each of said turrets having a like number of suction means disposed along the periphery thereof, means for feeding articles to pass between the turrets and to receive pressure therefrom simultaneously on opposite sides, a second turret associated with each of said constantly driven turrets, means for intermittently rotating said second turrets, the second intermittently driven turrets having suction means disposed along the periphery thereof, means for supplying labels to the suction means on said second turrets, means for transferring the labels from the second turret to the constantly driven turrets, and means for rendering the side of the labels to be applied to the articles adhesive before they contact the articles.

34. In a machine for applying labels to articles, means for exerting intermittent pressure on said labels of approximately equal force to move the mass of labels, means for returning said mass of labels to normal position, suction means for removing one label at a time from said mass while the mass is under pressure and moving it to another portion of the machine, other suction means for applying the label to the article, means for transferring the removed label from the first suction to the other suction means, and means for timing the transfer to determine the position the label will occupy on the article.

35. In a machine for applying labels simultaneously to both ends of a spool, two separate means for feeding two stacks of labels under intermittent pressure, a pair of suction means for removing a pair of the labels from said two stacks of labels, a pair of other suction means for receiving the labels from the first suction means and applying the same simultaneously to the ends of the spool and moving the spool through the machine, means for simultaneously transferring the two labels from the first suction means to the pair of other suction means, and means for timing the transfer to control the position of the labels on the spool.

36. A machine for applying labels to articles, comprising means for supporting a stack of superposed labels, means for intermittently exerting pressure on said stack to move the same, suction means for detaching one label at a time from the top of said stack while the stack is pressed against the suction means, means for causing the pressure when intermittently exerted on the stack to be approximately uniform regardless of the number of labels in the stack, other suction means for receiving the labels from the first suction means and applying the same to the articles, and means for transferring the labels from the first suction means to said other suction means.

37. Apparatus for applying labels to articles, comprising means for holding a stack of labels, intermittently movable suction means for detaching one label at a time from the stack, means for intermittently moving the stack of labels to engage the suction means, other suction means for receiving the labels from the first suction means and applying them to the articles, means for transferring the labels from the first suction means to the other suction means, means for cutting the suction off from the label immediately preceding its transfer from the first suction means to the other suction means, and means for rendering the label adhesive before it is applied to the article.

38. A machine for applying labels to articles comprising, means for holding a stack of superposed labels, suction means for detaching one label at a time from said stack, means for intermittently moving said stack to cause the uppermost label to be pressed against said suction means, other suction means for receiving the labels from the first suction means and applying the same to the articles, means for transferring the labels from said suction means to said other suction means, and means for timing the operation of the transferring means to determine the position of the label on the article.

39. Apparatus for applying labels to articles comprising, an intermittently rotating member having a plurality of suction means thereon, means for holding a stack of superposed labels, means for intermittently moving said stack of labels to cause the topmost label to engage one of said suction means while the intermittently rotating member is at rest, a constantly driven member associated with the intermittently rotating member and having a plurality of suction means thereon for holding labels and applying them to the articles, the plane of rotation of one rotating member being disposed at right angles to the plane of rotation of the other rotating member, means for transferring the labels from the intermittently rotating member to the constantly rotating member, and means for timing the transfer of the labels to thereby determine the position they will occupy on the article, 40. In a machine for applying labels to articles, two separated revolving turrets having spaced nozzles disposed along the periphery of each turret, means for creating a vacuum in said nozzles, means for intermittently delivering labels to said nozzles to be carried by the nozzles to be applied to the articles, means for feeding the articles between the turrets to be engaged simultaneously by a nozzle on each turret to apply the labels to oppositely disposed portions of the article.

41. In a machine for applying labels to articles of merchandise, two separated revolving turrets having spaced nozzles disposed around the periphery thereof, means for creating a partial vacuum in some of the nozzles as they approach a position to engage the articles, means for supplying labels to said nozzles to be applied to the article when engaged by the nozzles, means for feeding articles to a position where the articles will be engaged by the labels carried by the nozzles to apply the labels and to move the article through the machine.

42. In a machine for applying labels to articles, a label container, means for selecting one label at a time from said label container, said selecting means comprising suction nozzles having convex faces provided with air inlets near the outer edge thereof, means for removing said labels from the suction nozzles and applying the labels to the articles, and means for rendering said labels adhesive.

43. In a machine for applying labels to articles, a label container, means for selecting labels one at a time from said label container, said selecting means comprising suction nozzles having convex faces provided with air inlets near the outer edge thereof, means for receiving the labels from said suction nozzles and applying said labels to the articles, said means for receiving the labels from the suction means comprising suction nozzles having convex faces provided with air inlets near the outer edge thereof, and means for rendering said labels adhesive.

JOHN F. SCHENCK, Jr.